Oct. 7, 1924.  1,511,124
F. W. HART
EDUCATIONAL APPLIANCE
Filed May 13, 1920  5 Sheets-Sheet 1
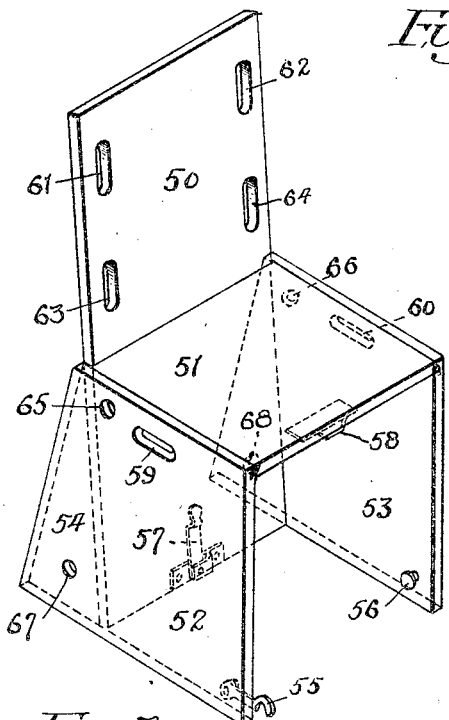
Fig. 1.
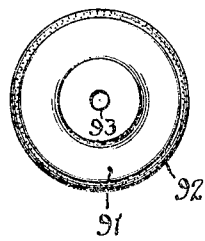
Fig. 6. Fig. 7.
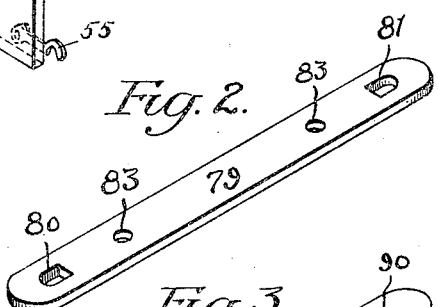
Fig. 2.
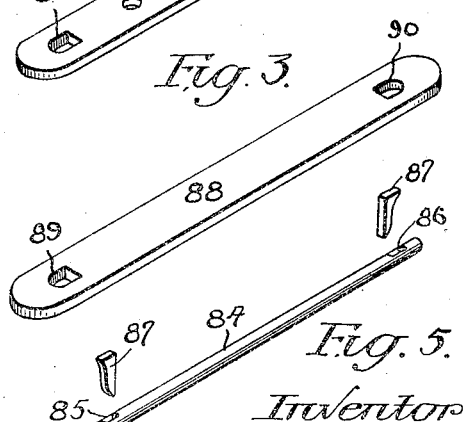
Fig. 3.
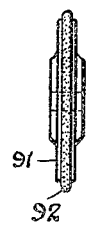
Fig. 4.
Fig. 5.
Inventor
FRANK WILLIAM HART
by his Attorneys

Oct. 7, 1924.  
F. W. HART  
EDUCATIONAL APPLIANCE  
Filed May 13, 1920

Inventor  
FRANK WILLIAM HART  
by his Attorneys

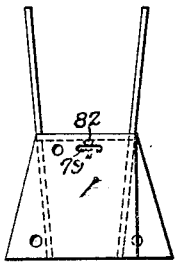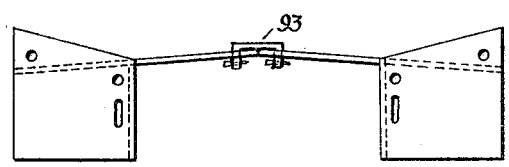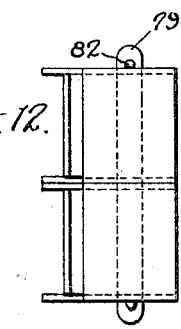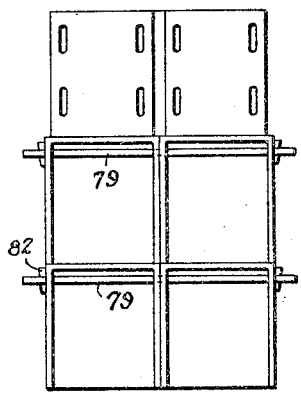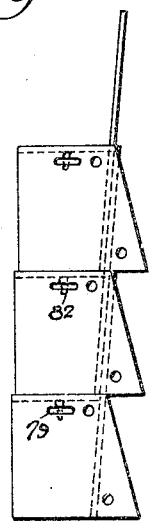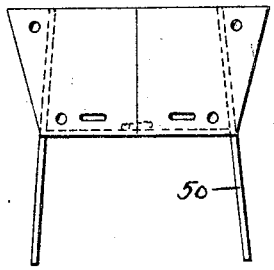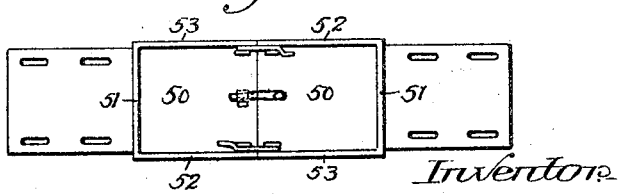

Oct. 7, 1924.
1,511,124
F. W. HART
EDUCATIONAL APPLIANCE
Filed May 13, 1920　　5 Sheets-Sheet 4
Fig. 20
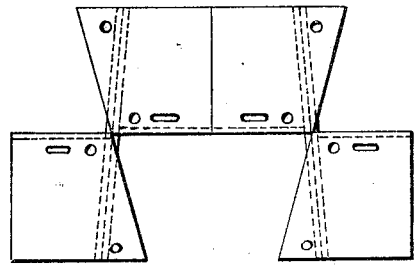
Fig. 21
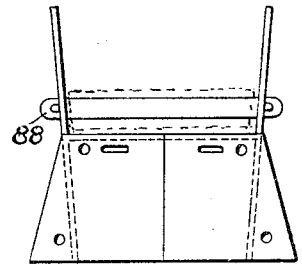
Fig. 22.
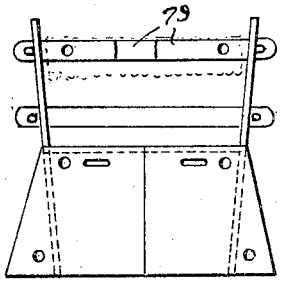
Fig. 23.
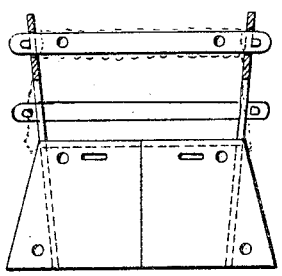
Fig. 24.
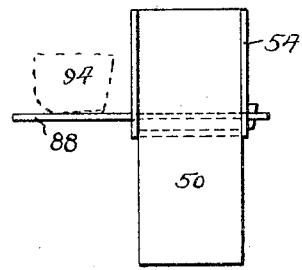
Fig. 25.
Fig. 26.
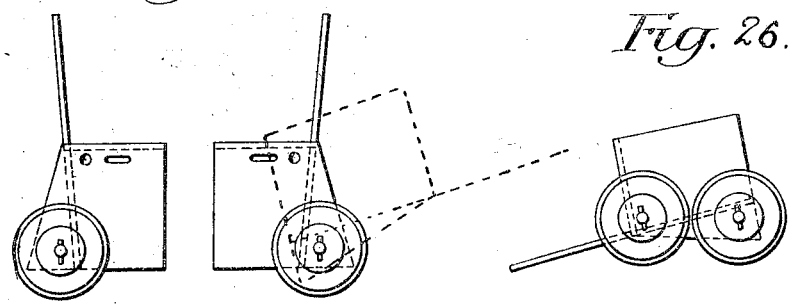
Fig. 27.
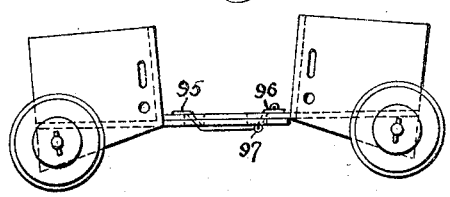
Fig. 36.
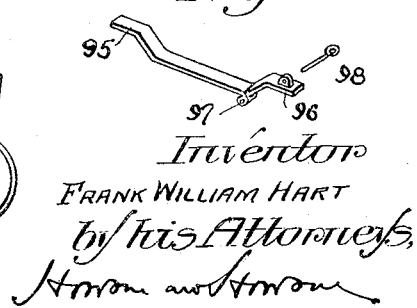
Inventor
FRANK WILLIAM HART
by his Attorneys Oct. 7, 1924.
F. W. HART
EDUCATIONAL APPLIANCE
Filed May 13, 1920
1,511,124
5 Sheets-Sheet 5
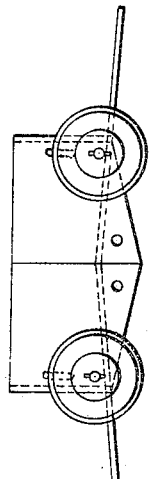
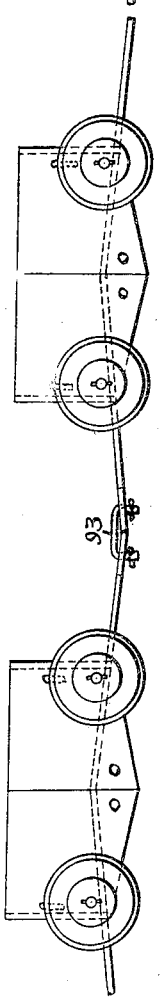
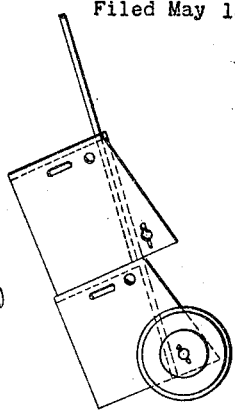
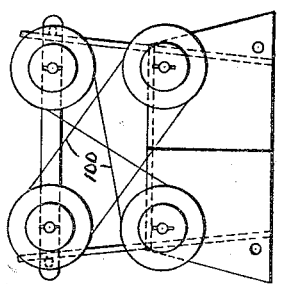
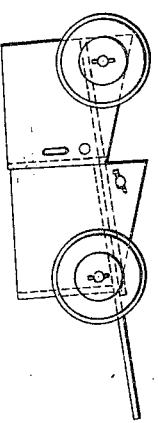
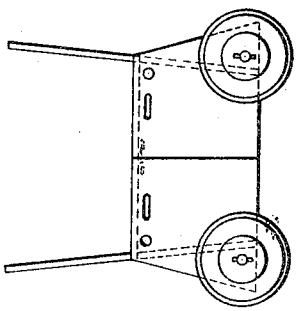
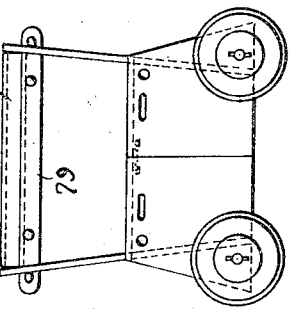
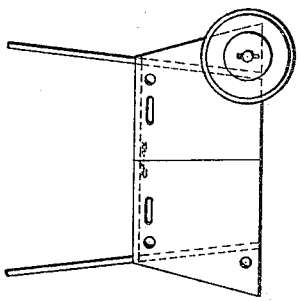
Inventor
FRANK WILLIAM HART
by his Attorneys Patented Oct. 7, 1924.

1,511,124

UNITED STATES PATENT OFFICE.

FRANK WILLIAM HART, OF NEW YORK, N. Y.

EDUCATIONAL APPLIANCE.

Application filed May 13, 1920. Serial No. 380,998.

*To all whom it may concern:*

Be it known that I, FRANK WILLIAM HART, a citizen of the United States of America, residing at New York city, borough of Manhattan, in the county of New York and State of New York, have invented certain new and useful Improvements in Educational Appliances, of which the following is a specification.

My invention relates to educational appliances, and particularly to an appliance for developing the constructive ingenuity of children. The object of my invention is to provide an appliance, preferably, but not necessarily, of some primary utilitarian value, which is susceptible of the adaptation to various structural combinations by the use of the child's imagination and ingenuity. Preferably, further, the structural combinations are, at least in some instances, such as to form articles well adapted for use in child's play.

In the accompanying drawings—

Fig. 1 is a perspective of a child's chair in which my invention is embodied in one form;

Fig. 2 is a perspective of a structural bar of one type for use therewith in the adaptation of the chair to different structural combinations;

Fig. 3 is a similar view of another type of bar;

Fig. 4 is a perspective of one of the cotter pins used with bars of the type shown in Figs. 2 and 3;

Fig. 5 is a perspective of an axle rod and its linch-pin extended for use in the adaptation of a chair to other structural combinations;

Figs. 6 and 7 are front and side elevations, respectively, of one of the wheels which fit the axle rod of Fig. 5;

Figs. 11 to 35 are more or less diagrammatic views showing some of the different structural combinations which may be effected, using one or more chairs of the present construction; and Fig. 36 is a perspective of one of the latching attachments employed.

Figure 8:
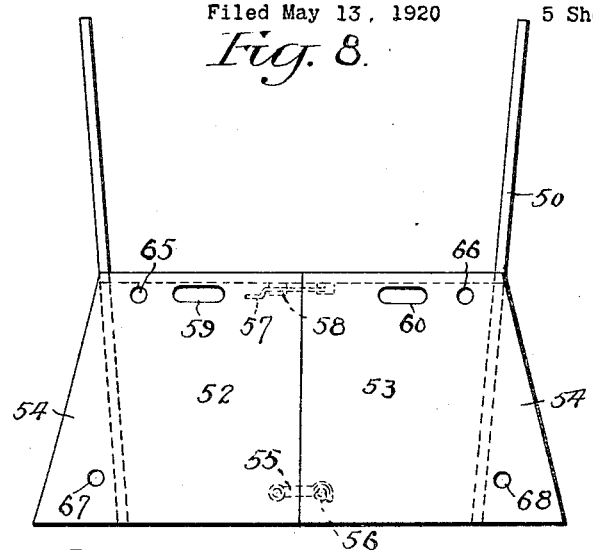
Fig. 8 is a side elevation to two chairs assembled face to face to form a settee with high arm pieces.

As above stated, while my invention may be embodied in a construction having no primary utility, I prefer to apply it to some utilitarian article, and have chosen for this purpose such a household necessity as a child's chair. Furthermore, while a chair or other article of knock-down construction could be used, the chair illustrated is permanently assembled, and the structural combinations start with this complete chair as the basic unit.

The construction is quite simple and rigid, comprising a back board 50 of substantially uniform width from bottom to top and extending on a slight backward inclination the entire vertical height of the chair; a seat 51, which may be slightly fashioned if preferred; and two side boards 52 and 53 mortised or otherwise fastened to the seat and back and extending beyond the latter as triangular flanges 54, which not only constitute an extended bottom support, affording great stability for the chair, but also serving as bearing supports for some of the structural combinations. In effecting the latter two or more chairs of like construction are generally used. Where latching devices are needed to hold the chairs together, they may be of any suitable sort—preferably of a type such that the parts on each chair are identical, so that any of the chairs in a group may be used in effecting the combination without the necessity of selecting particular ones in order to match the complementary latching parts. For kindergarten purposes, where a large number of chairs would be used, this feature is one of considerable convenience. However, for household use, when but two chairs would ordinarily be employed, this is not of so much importance, and I have shown latches of common type comprising hooks 55 and studs 56, or bars 57 and catches 58, the complementary parts of which are on different chairs. Beneath the seat 51 the side boards 52 and 53 are slotted at 59 and 60. Similar pairs of slots 61 and 62, 63 and 64, are provided in the back 50 above the seat and appropriately spaced from the edges of the back. These slots not only afford convenient hand holds when moving the chair, but also serve to receive the structural bars hereinafter referred to. The sides 52 and 53 are also pierced by holes 65 and 66 adjacent to the back 50 but beneath the seat. The flanges 54 are also pierced by a pair of holes 67 and 68 at an appropriate location toward the bottoms thereof. Other holes may be provided at suitable points, if desired, in order to render possible other structural combinations than those hereinafter mentioned. In order to strengthen the chair at points of wear or particular strain, it may be reenforced with angle irons, not shown, which may be pierced at bearing holes to take up the wear at these points.

To assist in the formation of different structural combinations, additional structural elements are provided independent of the chair proper. These may be of different types, and I have shown only some of the simplest. Thus, in Fig. 2, I have illustrated a bar 79 adapted to be passed through any of the slots 59 to 64, and having holes 80 and 81 at its opposite ends to receive cotters 82 (Fig. 4). Intermediate the cotter holes are bearing holes 83 to receive an axle rod 84 (Fig. 5), which is pierced at 85 and 86 to receive the linch-pins 87. A second bar 88 may also be provided which has only end holes 89 and 90 for cotter pins 82. Wheels 91, here shown as formed from wooden discs peripherally grooved to receive the tires 92, have bearing holes 93 fitting the axle rod 84.

I have indicated some of the structural combinations which are possible, using a chair, or chairs, of this type. Thus, in Fig. 8, I have shown a simple combination in which two chairs are arranged face to face and united by the latching elements 55 to 58 to afford a settee with high arm pieces formed by the backs of the chairs. A back for the settee could be provided by arranging the settee against the wall. If it is desired to use the settee in the middle of the room, a back could be provided, as shown in Fig. 9, by inserting the bars 79 and 88 through holes 62 and 64 at one side of the backs 50 and securing the bars in position by cotters 82. If the child wishes a wheel settee, it is only necessary to insert the rods 84 through the holes 67 and 68 in the flanges 54 at the opposite ends of the settee and mount the wheels 91 thereon.

Figure 10:
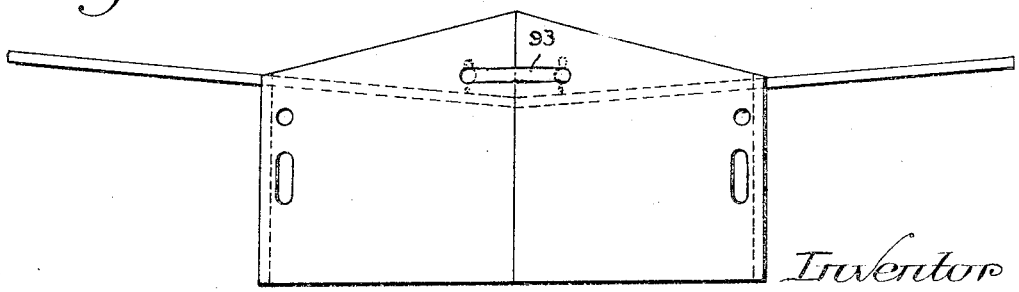
Fig. 10 is a side elevation of two chairs arranged bottom to bottom to afford a marble chute.

In Fig. 10 I have shown a marble chute by placing two chairs face down upon the floor with their bottoms juxtaposed. The marbles roll down the inclined backs 55 and gather at the meeting point of the backs. The chairs may be held together in this position by a spanner catch having legs which pass through the holes 67 and are secured by linch-pins 87.

In Fig. 11 a tête-à-tête is formed by placing the chairs side by side, but faced in opposite directions, in which position they are secured by the bar 79 passed through the slots 69 and 60 which are brought into register.

In Fig. 12 a bench is shown, having the chairs arranged side by side facing in the same direction, and again secured by the bar 79, as in Fig. 11.

In Fig. 13 a high chair is formed by placing one chair above the other, the back of the lower chair fitting between the flanges 54 of the upper chair and the parts being firmly held together by passing the rod 84 through the holes 67 in the upper chair. By arranging two sets of chairs in this way, side by side, and secured together as in Fig. 14, a four-room doll's play house is formed, and if a series of three chairs is superposed, the house may be increased in size, or the structure may be considered as a book-shelf or cupboard, (Fig. 15).

Figure 9:
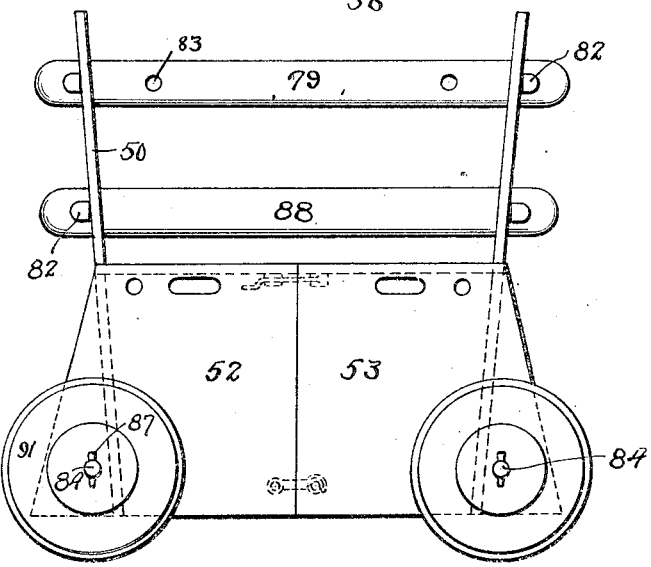
Fig. 9 is a similar view showing the settee mounted on wheels and provided with a back rest by the use of the bars of Figs. 2 and 3.

In Fig. 16 I have shown Fig. 8 inverted, the bottoms of the chairs now forming a box, which may be used as a window box for flowers.

By inverting the construction shown in Fig. 10, the marble slide is converted into a doll's cradle, (Fig. 17) which rocks upon the flanges 54. Fig. 18 shows this arrangement in plan.

In Fig. 19 the chairs are arranged face down with their backs abutting to form a bridge, beneath which trains and boats may pass, and over which dolls may walk, or toy engines run. To hold the backs together, a spanner 93, such as used in Fig. 10, may be passed through the slots 61 and 62 at the abutting ends of the chair backs.

In Fig. 20 I have shown a window box with end seats by the use of four chairs, each pair comprising one chair inverted and arranged with its back against the back of the upright chair.

In Fig. 21 I have illustrated a modification of Fig. 8, in which the settee is converted into a doll's bed by inserting through the lower slots 63 and 64 the side bars 88, between which is arranged the doll's mattress.

In Fig. 22 the bed of Fig. 21 is converted into a canopy bed by using also top bars 79, over which is hung a canopy. By removing one of the bottom bars 88 and dropping the canopy further down on one side, the canopy bed is transformed (Fig. 23) into a play theater, well adapted for "Punch and Judy" shows.

The window box of Fig. 16 is transformed into a play wash-tub (Fig. 24) by inserting bars 88 through the slots 59 and 60, drawing them out on one side, however, sufficiently far to afford a rest for the clothes basket 94.

The chair of Fig. 1 may be readily converted into a "board-walk" chair by adding wheels to the axle through the holes 67 in the flange, as illustrated in Fig. 25, and the "board-walk" chair is readily tilted, as shown in dotted lines in Fig. 25, to form a Roman chariot, in which case the doll stands on the back of the chair beneath the seat. The Roman chariot is readily converted into an ox cart (Fig. 26) by adding another pair of wheels on an axle passed through the bearing holes 65 and 66.

A "push-mobile" is formed by two chairs arranged with their backs overlying each other in substantially horizontal position (Fig. 27) and latched by any suitable means, such as the spanner 93 of Figs. 10 and 19, or by a special device of a construction such as shown in Fig. 36, having a tongue 95 adapted to be passed through the registering holes 92 and 94 of the two backs, and a second pivoted tongue 96 hinged thereto at 97 and adapted to be passed through the registering holes 61 and 63 of the superposed backs and secured by a cotter pin 98.

In Fig. 28 a freight car is formed by adding to the cradle of Fig. 17 axles passed through the bearing holes 65 and 66 and having wheels mounted thereon. A train of these cars is illustrated in Fig. 29, using the spanner 93 to hold the cars together.

In Fig. 30 a limousine is formed by applying wheels to the high chair of Fig. 13, as indicated, the axis of the rear wheel going through the flange holes 67 and 68, and the axis of the front wheels going through the holes 65 and 66 of the upper chair. The limousine is readily converted into a wheelbarrow (Fig. 31) by removing the front wheels. A jinrikisha (Fig. 32) is formed by adding wheels at one end of the settee of Fig. 10, while the wheel settee (Fig. 33) is formed by adding a second pair of wheels at the opposite ends of the jinrikisha.

A wheel table (Fig. 34) is readily formed by placing a table top 99 upon cross bars 79 passed through the holes 61 and 62 in the backs.

In Fig. 35 I have indicated another use to which the appliance may be put. By removing the tires 92 from the wheels 91, the latter are now converted into pulleys, and bands 100 may be arranged around the pulleys in various fashions to drive one from another. It is possible to form a child's loom by winding the warp threads from one axis to another at the top of the frame for the loom, the chairs and bars now constituting the loom frame.

These are but some of the possible combinations which may be effected with the particular constructions shown for the chair and the simple auxiliary structural pieces mentioned. They may be multiplied many times by adding to or varying the structural parts, as will be obvious to any one dealing with the invention. The size of the parts of the appliance does not enter into my invention, which contemplates the embodiment thereof in miniature construction, if desired, as a little toy. Moreover, the details of construction may be variously modified while still embodying the essentials of the invention. Thus, the backs and sides of the chair, instead of being solid, may be of slats or checkerwork; the wheels may be spoked and of metal instead of wood; while metal work may be used throughout for the body and associated structural elements. I would again point out that the basic unit of the appliance need not be utilitarian in its nature, nor need it be permanently assembled, since a knockdown construction affords still further adaptability to structural combinations and thus aids in developing the child's constructive imagination and ingenuity, without too far complicating the difficulties. This is the underlying purpose and thought of the invention.

I claim—

1. As an article of manufacture, a chair having a back, a seat, and side members below the seat, said side members having in register bearings adjacent their lower margins to receive a detachable axle for wheels on which the chair may be supported in upright or inclined position.

2. As an article of manufacture, a chair having a back, a seat, and side members below the seat, said side members having in register bearings adjacent their lower margins and to the rear of the lower margin of the back, to receive a detachable axle for wheels on which the chair may be supported in upright or inclined position.

3. As an article of manufacture, a chair having a back, a seat, and side members below the seat, said side members having in register bearings adjacent the seat to receive a detachable axle for wheels on which the chair may be supported in substantially horizontal position.

4. As an article of manufacture, a chair having a back, a seat, and side members below the seat, said side members being horizontally slotted in register below and adjacent the seat to receive a transversely extending detachable bar.

5. As an article of manufacture, a chair having a back, a seat, and side members below the seat, said back being vertically slotted adjacent each margin in substantially the same plane to receive a detachable bar.

6. As an article of manufacture, a chair having a back, a seat, and side members below the seat, said back being apertured to afford two pairs of vertically extending slots adjacent each side margin of the back, said pairs being vertically spaced from the seat.

7. As an article of manufatcure, a chair having a back, a seat, and side members below the seat, in combination with means below the seat for detachably uniting said chair to a like chair having complementary attaching elements.

8. As an article of manufacture, a chair having a back, a seat, and side members below the seat, in combination with means below the seat for detachably uniting said chair to a similar chair arranged face to face and provided with a complementary latching element.

9. As an article of manufacture, a chair having a back, a seat, and side members below the seat, in combination with means below the seat for detachably uniting said chair to a similar chair arranged base to base and provided with a complementary latching element.

10. As an article of manufacture, a chair having a back, a seat, and side members below the seat, in combination with means extending beneath the seat for detachably connecting said chair to another chair of similar construction arranged side by side thereto.

11. As an article of manufacture, a chair having a back extending substantially the full height of the chair, side members embracing and extending beyond the rear face of the chair back, a seat supported by the side members, said side members and back being apertured in the marginal areas thereof to receive detachable bars by which connection may be established with a second chair unit of like construction to form a composite article.

12. As an article of manufacture, a chair having a back extending substantially the full height of the chair, side members embracing and extending beyond the rear face of the chair back, a seat supported by the side members, said side members being pierced in register adjacent their upper and lower margins to receive detachable axles for supporting wheels.

13. As an article of manufacture, a chair having a back extending substantially the full height of the chair, side members embracing and extending beyond the rear face of the chair back, a seat supported by the side members, said side members being pierced in register adjacent their lower margins and to the rear of the back to accommodate axles for wheels on which the chair may be supported.

14. As an article of manufacture, a chair having a back extending substantially the full height of the chair, side members embracing and extending beyond the rear face of the chair back, a seat supported by the side members, said back and side members being apertured to receive detachable bars and axles, together with means below the seat for detachably connecting said chair to a second chair unit of like construction provided with complementary latching elements.

In testimony whereof I have signed my name to this specification.

FRANK WILLIAM HART.